(12) United States Patent
Suh et al.

(10) Patent No.: US 12,713,261 B2
(45) Date of Patent: Aug. 18, 2026

(54) SENSING MEASUREMENT REPORT FRAME FORMAT

(71) Applicant: HUAWEI TECHNOLOGIES CO., LTD., Shenzhen (CN)

(72) Inventors: Jung Hoon Suh, Kanata (CA); Osama Aboul-Magd, Kanata (CA); Yan Xin, Kanata (CA); Kwok Shum Au, Kanata (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 466 days.

(21) Appl. No.: 18/119,912

(22) Filed: Mar. 10, 2023

(65) Prior Publication Data

US 2023/0300657 A1 Sep. 21, 2023

Related U.S. Application Data

(60) Provisional application No. 63/320,879, filed on Mar. 17, 2022.

(51) Int. Cl.
*H04W 24/10* (2009.01)

(52) U.S. Cl.
CPC .................................. *H04W 24/10* (2013.01)

(58) Field of Classification Search
CPC ..... H04W 24/10; H04W 84/12; H04W 24/08; H04L 1/0026
See application file for complete search history.

(56) References Cited

U.S. PATENT DOCUMENTS

2021/0288779 A1 9/2021 Da Silva et al.
2025/0039717 A1* 1/2025 Dong .................... H04W 24/10
2025/0159524 A1* 5/2025 Lim .......................... H04L 5/00

FOREIGN PATENT DOCUMENTS

CN 113965954 A 1/2022
WO 2022039669 A1 2/2022

OTHER PUBLICATIONS

Claudio da Silva, "Proposed Draft Text for Sensing Measurement Report frame (excl. format)", TGbf, 22/235r2, Feb. 2022.
IEEE Standard for Information Technology—Local and Metropolitan Area Networks—Specific Requirements Part 11: Wireless LAN MAC and PHY Specifications, IEEE Std 802.Nov. 2020, p. 939.
Draft Standard for Information technology—Telecommunications and information exchange between systems Local and metropolitan area networks—Specific requirements, IEEE 802.11bf, Working Group of the LAN/MAN Standards Committee of the IEEE Computer Society, Jul. 2023.

(Continued)

*Primary Examiner* — Chuong A Ngo

(57) ABSTRACT

There is provided a method and apparatus associated with a sensing measurement report frame format. A method includes receiving, by an access point (AP) or a station (STA), a request for at least one sensing measurement report. The method also includes transmitting, by the AP or the STA, a sensing measurement report frame that includes a category field, a public action field, and at least one measurement set-up identifier field and at least one sensing measurement report element. The sensing management report frame can include a category field, a public action field, a dialog token field, a measurement set-up identifier field, and a sensing measurement report element.

20 Claims, 8 Drawing Sheets

| Category 704 | Public Action 706 | Measurement Set-up ID 708 | Measurement Instance ID 710 | AID 1 712 | Sensing Measurement Report 1 714 | ... | AID N 716 | Sensing Measurement Report N 718 |
|---|---|---|---|---|---|---|---|---|

(56) References Cited

OTHER PUBLICATIONS

Chaoming Luo et al, "Measurement setup frame formats", IEEE 802.11-21/1828r4, Nov. 9, 2021, total 16 pages, XP068187507.
Claudio da Silva, "Proposed Draft Text for Sensing Measurement Report frame (excl. format)", IEEE 802.11-22/023Sr5, 2022-02, total 4 pages, XP068189086.
Chaoming Luo, "Proposed Draft Text: SBP frames", IEEE 802.11-22/0223r5, Mar. 2022, total 5 pages, XP068189416.

* cited by examiner

FIG. 1
100
Octets
Category
104
Public Action
106
Dialog Token
108
Measurement Set-up
ID
110
Sensing Measurement
Report
112
Variable

200

| | Element ID 204 | Length 206 | Element ID Extension 208 | Sensing Measurement Report Type 210 | Sensing Measurement Report Control 212 | Sensing Measurement Report 214 |
|---|---|---|---|---|---|---|
| Octets | 1 | 1 | 1 | TBD | TBD | Variable |

Figure 5:
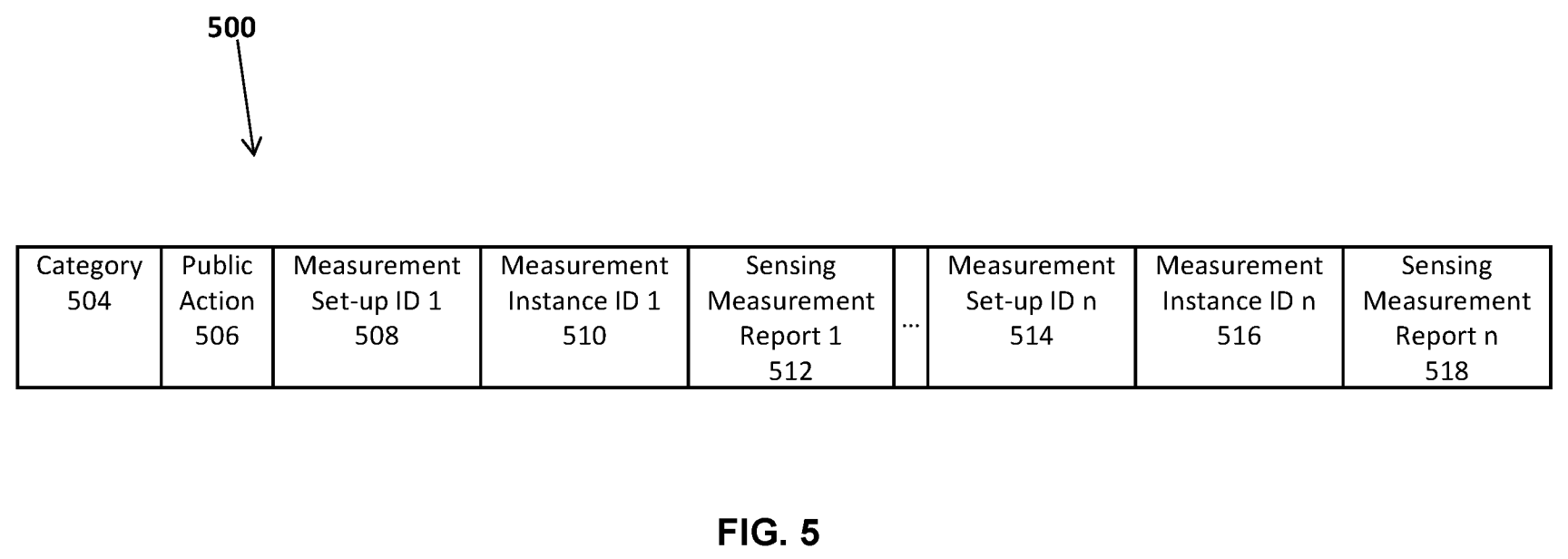

| Category 504 | Public Action 506 | Measurement Set-up ID 1 508 | Measurement Instance ID 1 510 | Sensing Measurement Report 1 512 | … | Measurement Set-up ID n 514 | Measurement Instance ID n 516 | Sensing Measurement Report n 518 |
| --- | --- | --- | --- | --- | --- | --- | --- | --- |

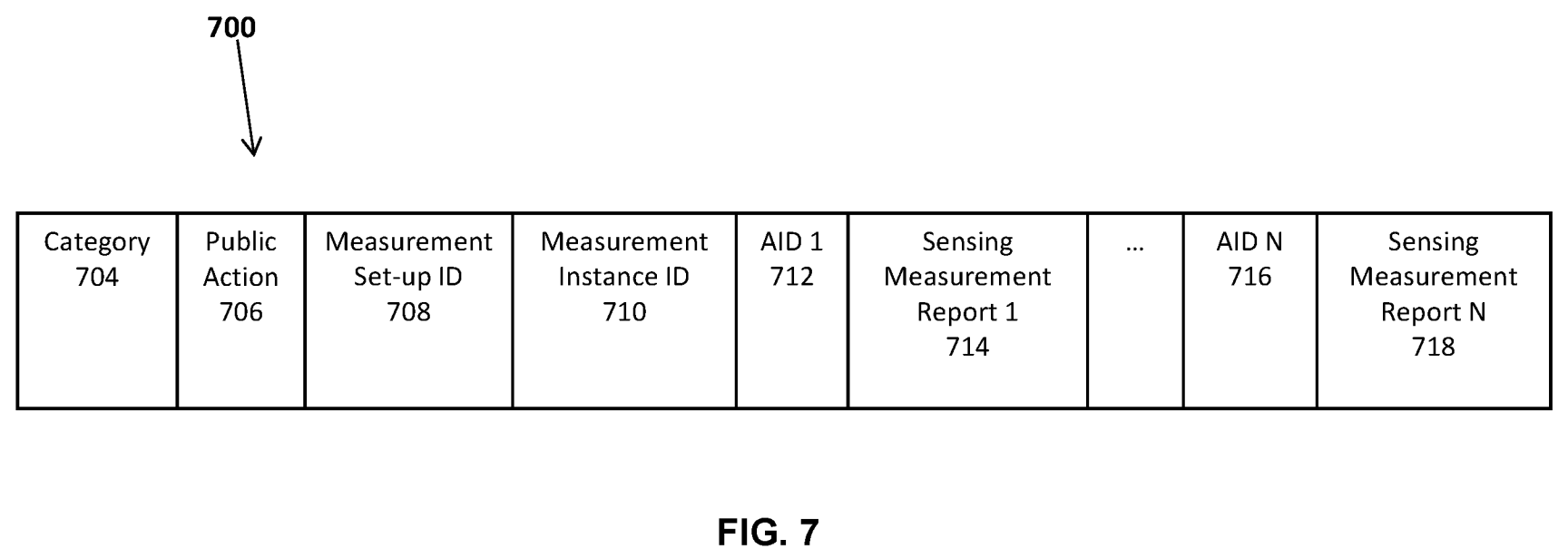

Category 704

Public Action 706

Measurement Set-up ID 708

Measurement Instance ID 710

AID 1 712

Sensing Measurement Report 1 714

...

AID N 716

Sensing Measurement Report N 718

FIG. 7

SENSING MEASUREMENT REPORT FRAME FORMAT

CROSS-REFERENCE TO RELATED APPLICATIONS

This application claims the benefit of and priority to U.S. provisional patent application No. 63/320,879 filed on Mar. 17, 2022, entitled "SENSING MEASUREMENT REPORT FRAME FORMAT", the entire contents of which is incorporated herein by reference.

FIELD

The present disclosure pertains to the field of communication networks, and particularly to a method and a frame format related to sensing measurement report frames.

BACKGROUND

The IEEE 802.11bf (11bf) standard is intended to modify existing wireless local area network (WLAN) standards to enhance sensing capabilities through 802.11-compliant waveforms. Using IEEE 802.11bf, a station (STA) can detect features (e.g., range, velocity, angular, motion, presence or proximity, gesture, etc.) of intended targets (e.g., objects, humans, animals, etc.) in an environment (e.g., house, office, room, vehicle, enterprise, etc.) using received Wi-Fi signals.

A Wi-Fi sensing session is initiated by a STA which serves as the sensing initiator. The sensing session generally has a setup phase to establish and exchange operation parameters of the sensing session and a measurement phase during which sensing measurements are performed. The sensing session then has a reporting phase, during which sensing measurements are reported to or obtained by the sensing initiator, followed by a termination phase which ends the sensing session. During the reporting phase, non-access point (AP) STAs and APs may transmit sensing measurement report frames which include one or more sensing measurement reports. However, certain details are missing in sensing measurement report frames in the IEEE 802.11bf draft standard. Therefore, there is a need for a method and a frame format that obviates or mitigates one or more limitations of the prior art.

This background information is provided to reveal information believed by the applicant to be of possible relevance to the present disclosure. No admission is necessarily intended, nor should be construed, that any of the preceding information constitutes prior art against the present invention.

SUMMARY

The present disclosure provides methods and apparatus related to providing details in a sensing management reporting frame. In one aspect, a measurement setup identifier field is provided in the sensing management reporting frame. The measurement setup identifier field may be one octet (one byte) but may also be other appropriate sizes. The present disclosure also provides a sensing measurement report frame action field format which can be used to provide an aggregated channel state information report. This field format can be used to aggregate a plurality of different measurement setup identifiers, instance identifiers, and measurement reports into a single sensing measurement report frame. The present disclosure also provides a measurement report frame format which can be used to enable sensing by proxy (SBP). The frame format can be used by an access point (AP) in a transmission to a non-AP station (STA) that initiated a sensing session. The frame format can aggregate a plurality of sensing measurement reports with identification of each device which generated the sensing measurement reports. The present disclosure also provides two formats which can be used in the sensing management report control field. These two formats can be used for channel state information (CSI) feedback and for truncated channel impulse response (TCIR) feedback, respectively.

A first aspect of the disclosure provides for a method including receiving, by an AP or a STA, a request to transmit at least one sensing measurement report. The method also includes transmitting, by the AP or the STA, a sensing measurement report frame including a category field, a public action field, and at least one measurement set-up identifier field and at least one sensing measurement report element.

In one aspect, the sensing measurement report frame can include a category field, a public action field, a dialog token field, a measurement set-up identifier field, and a sensing measurement report element. Each of the category field, the public action field, the dialog token field, and the measurement set-up identifier field may be one octet (one byte) in size. The sensing measurement report field may also be another appropriate size.

In another aspect, the sensing measurement report frame may include a category field, a public action field, and a plurality of sensing measurement reports. For each of the sensing measurement reports, the frame can include a measurement set-up identifier field, a measurement instance identifier field, and a sensing measurement report field.

According to one aspect, the sensing measurement report frame can include a category field, a public action field, a measurement set-up identifier field, a measurement instance identifier field, and a plurality of sensing measurement reports. For each of the sensing measurement reports, the frame can include a station identifier field and a sensing measurement report field. The station identifier field may be an association identifier (AID) field.

In another aspect, the at least one sensing measurement report element may include an element identifier field, a length field, an element identifier extension field, a sensing measurement report type field, a sensing measurement report control field, and a sensing measurement report field. When the sensing measurement report is a CSI report, the sensing measurement report control field can include a feedback bandwidth subfield, an initiator to responder (I2R) number of space time streams (N_STS) subfield, a responder to initiator (R2I) N_STS subfield, a number of subcarrier groups (Ng) subfield, a scale factor subfield, and a CSI feedback bit size subfield. Alternatively, when the sensing measurement report is a TCIR report, the sensing measurement report control field can include a feedback bandwidth subfield, an I2R N_STS subfield, an R2I N_STS subfield, and a number of TCIR taps subfield.

According to another aspect, an apparatus is provided, where the apparatus includes: a memory, configured to store a program; a processor, configured to execute the program stored in the memory, and when the program stored in the memory is executed, the processor is configured to perform one or more of the methods described herein.

In another aspect, a computer readable medium is provided, where the computer readable medium stores program code executed by a device, and the program code is used to perform one or more of the methods the described herein.

According to another aspect, a chip is provided, where the chip includes a processor and a data interface, and the processor reads, by using the data interface, an instruction stored in a memory, to perform one or more of the methods the described herein.

Other aspects of the disclosure provide for apparatus, and systems configured to implement one or more of the methods disclosed herein. For example, wireless stations (STAs) and access points (APs) can be configured with machine readable memory containing instructions, which when executed by the processors of these devices, configures the devices to perform one or more of the methods disclosed herein.

Embodiments have been described above in conjunction with aspects of the present invention upon which they can be implemented. Those skilled in the art will appreciate that embodiments may be implemented in conjunction with the aspect with which they are described but may also be implemented with other embodiments of that aspect. When embodiments are mutually exclusive, or are incompatible with each other, it will be apparent to those skilled in the art. Some embodiments may be described in relation to one aspect, but may also be applicable to other aspects, as will be apparent to those of skill in the art.

BRIEF DESCRIPTION OF THE FIGURES

Further features and advantages of the present invention will become apparent from the following detailed description, taken in combination with the appended drawings, in which:

FIG. 2 illustrates a sensing measurement report element format, according to an embodiment of the present disclosure.

FIG. 5 illustrates an aggregated channel state information report format, according to an embodiment of the present disclosure.

FIG. 7 illustrates an aggregated measurement report field format which may be transmitted from an access point to a station, according to an embodiment of the present disclosure.

It will be noted that throughout the appended drawings, like features are identified by like reference numerals.

DETAILED DESCRIPTION

Figure 1:
FIG. 1 illustrates a sensing measurement report frame action field format, according to an embodiment of the present disclosure.

The IEEE 802.11bf standard is intended to add wireless local area network (WLAN) sensing (SENS) capabilities to allow a station (STA) to perform WLAN sensing and obtain measurement results. A sensing initiator is a STA which initiates a WLAN sensing session. These sessions generally have four phases: a setup phase, a measurement phase, a reporting phase, and a termination phase. During the reporting phase, STAs including both access points (APs) and non-AP STAs may report results of measurements performed during the measurement phase. These results will generally be reported to or obtained by the sensing initiator and may be transmitted in Sensing Measurement Report frames.

In one aspect of the present disclosure, a sensing measurement report frame action field format is provided which includes both a field for the measurement instance identifier and a field for the measurement setup identifier. Each of these fields may be one octet in size, although other sizes may also be selected as may be appropriate. The measurement instance identifier may be included in either a measurement instance identifier field or in a dialog token field and may indicate the WLAN sensing session associated with the sensing measurement report. The measurement setup identifier may be used to indicate the operational parameters of the WLAN sensing session.

In another aspect of the present disclosure, two subfield formats for a sensing measurement report control field are provided. The first subfield format may be appropriate to use when transmitting a channel state information (CSI) sensing measurement report. This subfield format may include a feedback bandwidth subfield, an initiator to responder (I2R) number of space time streams (N_STS) subfield, a responder to initiator (R2I) N_STS subfield, a number of subcarrier groups (Ng) subfield, a scale factor subfield, and a CSI feedback (FB) bit size subfield. A second subfield format may be appropriate to use when transmitting a truncated channel impulse response (TCIR) sensing measurement report. This subfield format may include a feedback bandwidth subfield, an I2R N_STS subfield, a R2I N_STS subfield, and a number of TCIR taps subfield.

One aspect of the present disclosure provides a sensing measurement report frame action field format for an aggregated CSI report. This frame may be used to aggregate multiple CSI reports with multiple measurement setup IDs and instance IDs into a single frame. The field format can include a category field and a public action field. The field format further includes multiple sensing measurement reports, and for each of those reports the field format includes a measurement set-up ID field, a measurement instance ID field, and a sensing measurement report field.

Another aspect of the present disclosure describes an aggregated measurement report field format which can be used to enable sensing by proxy (SBP). SBP can be used to allow client-based sensing, where both the sensing initiator and the sensing responder(s) are non-AP STAs, using an intermediary AP. In an SBP process, multiple non-AP STAs may each send sensing management reports to the AP. The AP may then aggregate those sensing measurement reports and send an aggregated sensing measurement report to the sensing initiator. The aggregated measurement report field format includes a category field, a public action field, a measurement setup identifier field, a measurement instance identifier field, and multiple sensing measurement reports. For each sensing measurement report, the field format includes the sensing measurement report and an indication of the STA that generated the sensing measurement report. This indication may be an association identifier (AID).

FIG. 1 illustrates a sensing measurement report frame action field format 100, according to an embodiment of the present disclosure. The sensing measurement report frame action field format 100 can have multiple fields including: a category field 104, a public action field 106, a dialog token field 108, a measurement set-up ID field 110, and a sensing measurement report element 112.

Each field of the sensing measurement report frame action field format 100 may be allocated a certain size. The category field 104, the public action field 106, the dialog token field 108, and the measurement set-up ID field 110 may each be assigned 1 octet. The sensing measurement report element 112 may be assigned a variable number of octets. While the measurement set-up ID field 110 is illustrated as being 1 octet, other sizes may also be used as appropriate. Each octet is 8 bits or 1 byte.

A dialog token field 108, or a measurement instance ID field, in the sensing measurement report frame action field format 100 may be used to provide an indication of the measurement instance identifier. The measurement set-up ID field 110 indicates the measurement setup identifier, which may be used to identify attributes of the sensing measurement instance. As described above, the dialog token field 108 may be a one-byte field. This size may be insufficient to indicate both the measurement instance identifier and the measurement setup identifier. Therefore, it may be advantageous to include both a one-byte dialog token field 108 and a one-byte measurement set-up ID field 110 as in field format 100.

FIG. 2 illustrates a sensing measurement report element format 200, according to an embodiment of the present disclosure. The sensing measurement report element format 200 may be used as a format for the sensing measurement report element 112 of FIG. 1. The sensing measurement report element format 200 can have multiple fields including: an element ID field 204, a length field 206, an element ID extension field 208, a sensing measurement report type field 210, a sensing measurement report control field 212, and a sensing measurement report field 214.

Each field of the sensing measurement report element format 200 is allocated a certain size. The element ID field 204, length field 206, and the element ID extension field 208 can each be assigned 1 octet, namely 8 bits. The sensing measurement report type field 210 and the sensing measurement report control field 212 can be each assigned a length which may also be an octet or other size which may be subsequently defined. The sensing measurement report field 214 may be assigned a variable number of octets.

In some embodiments, the sensing measurement report type field 210 may have a value from 0 to 255 which identifies the type of sensing measurement report which is being included. A sensing measurement report type field 210 with a value of 0 may be used to signal a CSI sensing measurement report, while a value between 1 and 255 may be reserved for other uses.

The sensing measurement report field 214 may be used to report sensing measurements obtained by a sensing receiver. The sensing measurement report control field 212 contains information which may be necessary to interpret the sensing measurement report field 214. The sensing measurement report control field 212 may itself include one or more subfields, such as N subfields numbered from subfield 1 to subfield N. The number of subfields used and the length of each of these subfields may vary depending, at least in part, on the feedback type indicated in the sensing measurement report type field 210.

Figure 3:
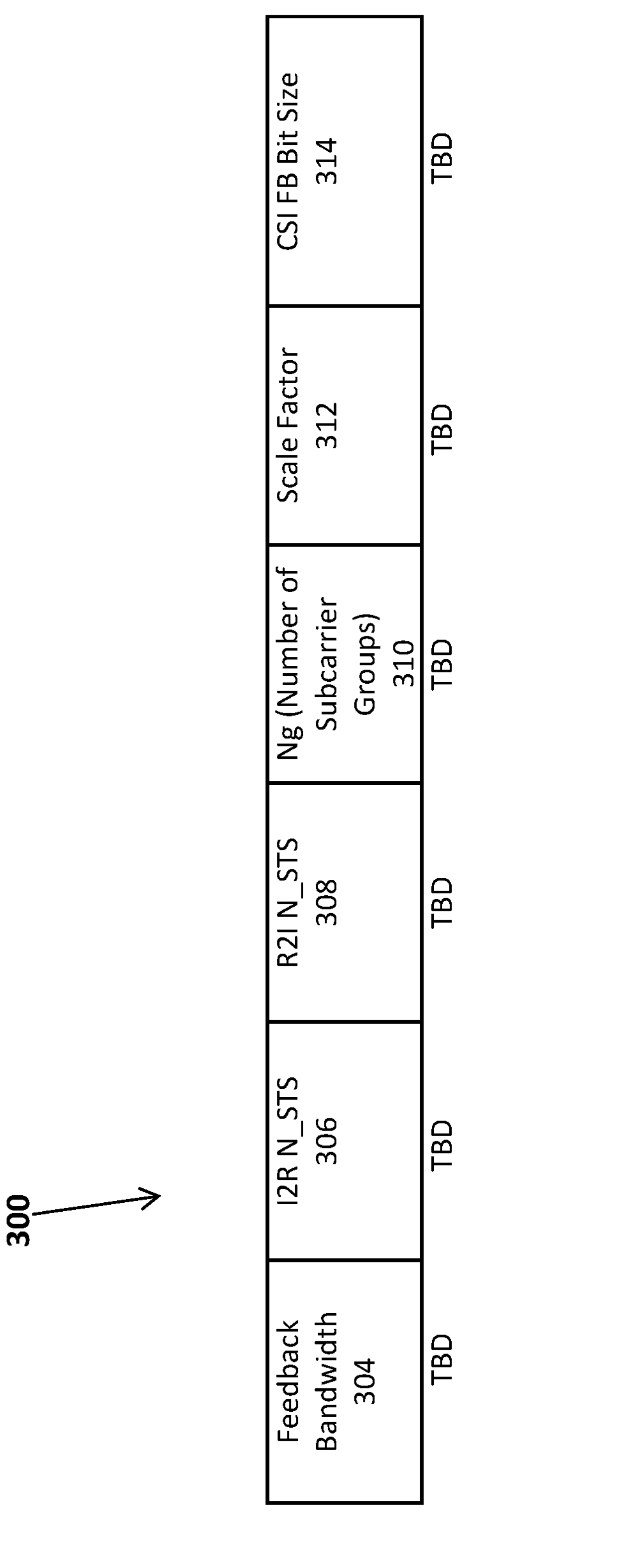
FIG. 3 illustrates a sensing measurement report control field subfield format, according to an embodiment of the present disclosure.

FIG. 3 illustrates a sensing measurement report control field subfield format 300, according to an embodiment of the present disclosure. The sensing measurement report control field subfield format 300 may be used as a format for the sensing measurement report control field 212 of FIG. 2 and may be appropriate for a CSI sensing measurement report, as signaled in the sensing measurement report type field 210.

According to embodiments, the sensing measurement report control field subfield format 300 can include multiple subfields including: a feedback bandwidth subfield 304, an I2R N_STS subfield 306, a R2I N_STS subfield 308, a Ng subfield 310, a scale factor subfield 312, and a CSI FB bit size subfield 314. Each of these subfields may be assigned an appropriate number of bits.

Figure 4:
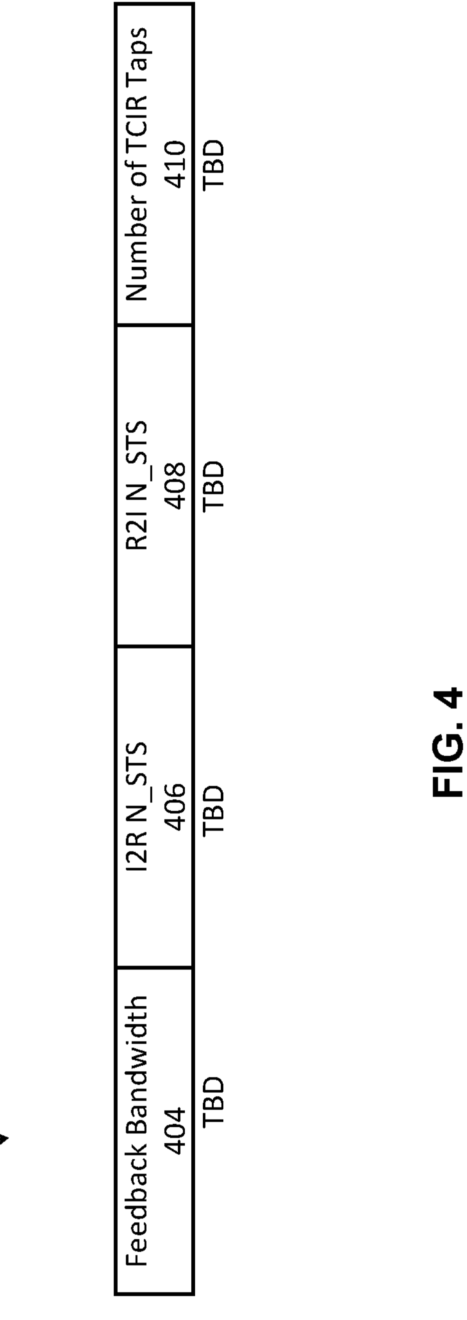
FIG. 4 illustrates another sensing measurement report control field subfield format, according to an embodiment of the present disclosure.

FIG. 4 illustrates another sensing measurement report control field subfield format 400, according to an embodiment of the present disclosure. The sensing measurement report control field subfield format 400 may be used as a format for the sensing measurement report control field 212 of FIG. 2 and may be appropriate for a TCIR sensing measurement report, as signaled in the sensing measurement report type field 210.

According to embodiments, the sensing measurement report control field subfield format 400 can have multiple subfields including: a feedback bandwidth subfield 404, an I2R N_STS subfield 406, a R2I N_STS subfield 408, and a number of TCIR taps subfield 410. Each of these subfields may be assigned an appropriate number of bits.

FIG. 5 illustrates a sensing measurement report frame action field format 500 for an aggregated CSI report, according to an embodiment of the present disclosure. The sensing measurement report frame action field format 500 may be used for aggregating multiple CSI sensing measurement reports, with each report including a measurement setup identifier and a measurement instance identifier. As illustrated, the sensing measurement report frame action field format 500 includes N sensing measurement reports, numbered from 1 to N, and can include three fields for each of the N sensing measurement reports: a measurement set-up ID field, a measurement instance ID field, and a sensing measurement report field.

According to embodiments, the sensing measurement report frame action field format 500 can have multiple fields including: a category field 504 and a public action field 506. The field format 500 can further include N sensing measurement reports numbered from 1 to N. The field format 500 can include a measurement set-up ID 1 field 508, a measurement instance ID 1 field 510, a sensing measurement report 1 field 512, wherein there can be multiple copies of each of these fields such that the number of copies of these fields can align with that as identified in the measurement set-up ID N field 514. The field format 500 can further include a measurement instance ID N field 516 and a sensing measurement Report N field 518. Each of these fields may be assigned an appropriate number of bits.

Figure 6:
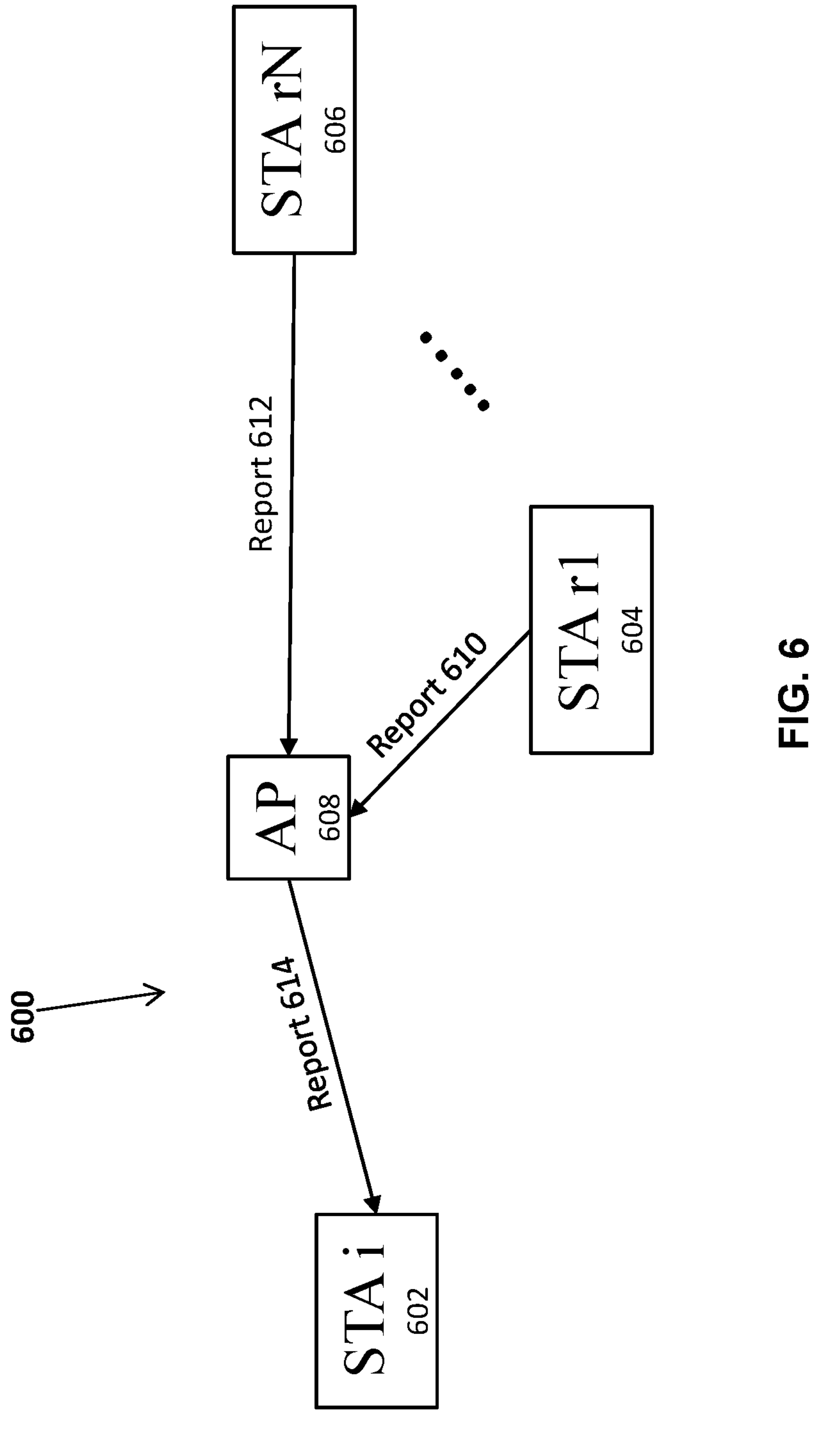
FIG. 6 illustrates a network of devices which may transmit reports to enable sensing by proxy, according to an embodiment of the present disclosure.

FIG. 6 illustrates a network of devices 600 which may transmit reports to enable sensing by proxy, according to an embodiment of the present disclosure. Generally, SBP is client-based sensing, where both the sensing initiator and the sensing responder(s) can be STAs which are not APs. However, some wireless communication systems may not allow peer-to-peer sensing among non-AP STAs. Thus, the SBP may be accomplished using an AP which can communicate with the sensing initiator and one or more sensing responders.

In this example, STA i 602 may initiate the WLAN sensing process by transmitting a request for sensing reports to AP 608. The AP 608 may receive the request and may communicate this request to a plurality of STAs, such as N STAs identified as STA r1 604 to STA rN 606. Each of the N STAs may send sensing measurement reports back to AP 608, such as report 610 from STA r1 604 and report 612 from STA rN 606. Each of the reports 610, 612 from the STAs 604, 606 to the AP 608 may use the formats described above, such as field formats 100, 500. The AP 608 may then aggregate the N reports 610, 612 from the STAs 604, 606 and transmit an aggregated measurement report 614 to STA i 602.

FIG. 7 illustrates an aggregated sensing measurement report field format 700 which may be transmitted from an AP to a STA, according to an embodiment of the present disclosure. This field format 700 may be used for transmitting aggregated management reports such as report 614. An aggregated sensing measurement report may include a plurality of sensing measurement reports and may include an indication of the identity of each STA which generated each of the plurality of sensing measurement reports. The indication of identity can be an association identifier. For example, the aggregated sensing measurement report may include N sensing measurement reports.

The aggregated measurement report field format 700 can have multiple fields including: a category 704, a public action 706, a measurement set-up ID 708, and a measurement instance ID 710. The field format further includes N sensing management reports and an AID for each of those reports, ranging from AID 1 712 and sensing management report 1 714 up to AID N 716 and sensing management report N 718. Each of the AIDs may indicate the identity of the STA which generated the associated sensing management report, such as AID 1 712 indicating the identity of the STA which generated sensing management report 1 714.

Figure 8:
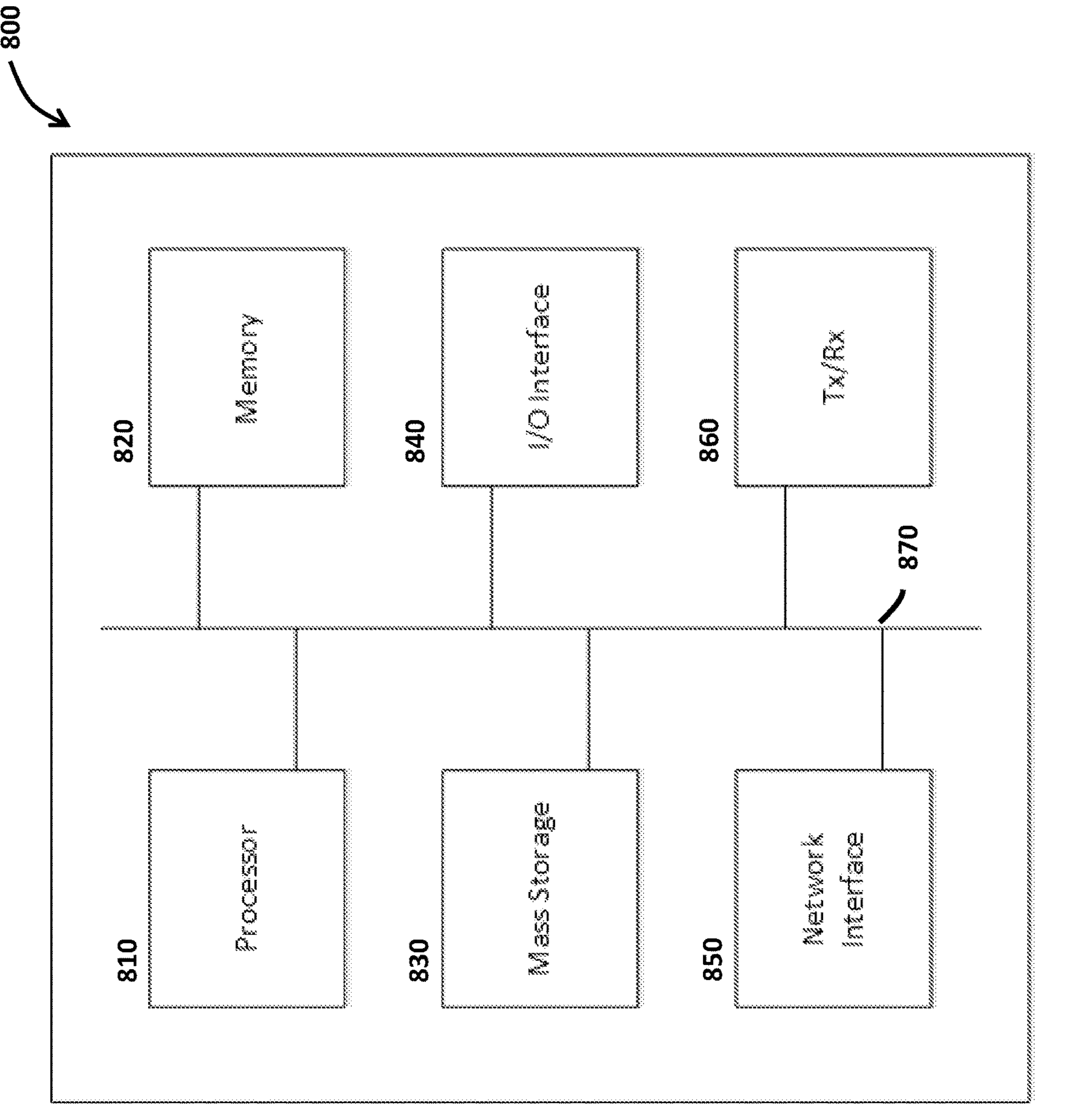
FIG. 8 is a schematic diagram of an electronic device that may perform any or all of operations of the above methods and features explicitly or implicitly described herein, according to different embodiments of the present disclosure.

FIG. 8 is a schematic diagram of an electronic device 800 that may perform any or all of operations of the above methods and features explicitly or implicitly described herein, according to different embodiments of the present disclosure. For example, a computer equipped with network function may be configured as electronic device 800. In some embodiments, the electronic device 800 may be a user equipment (UE), an AP, a STA, or the like as appreciated by a person skilled in the art.

As shown, the electronic device 800 may include a processor 810, such as a central processing unit (CPU) or specialized processors such as a graphics processing unit (GPU) or other such processor unit, memory 820, non-transitory mass storage 830, input-output interface 840, network interface 850, and a transceiver 860, all of which are communicatively coupled via bi-directional bus 870. According to certain embodiments, any or all of the depicted elements may be utilized, or only a subset of the elements. Further, electronic device 800 may contain multiple instances of certain elements, such as multiple processors, memories, or transceivers. Also, elements of the hardware device may be directly coupled to other elements without the bi-directional bus. Additionally, or alternatively to a processor and memory, other electronics, such as integrated circuits, may be employed for performing the required logical operations.

The memory 820 may include any type of non-transitory memory such as static random access memory (SRAM), dynamic random access memory (DRAM), synchronous DRAM (SDRAM), read-only memory (ROM), any combination of such, or the like. The mass storage element 830 may include any type of non-transitory storage device, such as a solid state drive, hard disk drive, a magnetic disk drive, an optical disk drive, USB drive, or any computer program product configured to store data and machine executable program code. According to certain embodiments, the memory 820 or mass storage 830 may have recorded thereon statements and instructions executable by the processor 810 for performing any of the aforementioned method operations described above.

Embodiments of the present disclosure can be implemented using electronics hardware, software, or a combination thereof. In some embodiments, the disclosure is implemented by one or multiple computer processors executing program instructions stored in memory. In some embodiments, the disclosure is implemented partially or fully in hardware, for example using one or more field programmable gate arrays (FPGAs) or application specific integrated circuits (ASICs) to rapidly perform processing operations.

It will be appreciated that, although specific embodiments of the technology have been described herein for purposes of illustration, various modifications may be made without departing from the scope of the technology. In particular, it is within the scope of the technology to provide a computer program product or program element, or a program storage or memory device such as a magnetic or optical wire, tape or disc, or the like, for storing signals readable by a machine, for controlling the operation of a computer according to the method of the technology and/or to structure some or all of its components in accordance with the system of the technology.

Acts associated with the method described herein can be implemented as coded instructions in a computer program product. In other words, the computer program product is a computer-readable medium upon which software code is recorded to execute the method when the computer program product is loaded into memory and executed on the microprocessor of the wireless communication device.

Further, each operation of the method may be executed on any computing device, such as a personal computer, server, personal digital assistant (PDA), or the like and pursuant to one or more, or a part of one or more, program elements, modules or objects generated from any programming language, such as C++, Java, or the like. In addition, each operation, or a file or object or the like implementing each said operation, may be executed by special purpose hardware or a circuit module designed for that purpose.

Through the descriptions of the preceding embodiments, the present disclosure may be implemented by using hardware only or by using software and a necessary universal hardware platform. Based on such understandings, the technical solution of the present disclosure may be embodied in the form of a software product. The software product may be stored in a non-volatile or non-transitory storage medium, which can be a compact disc read-only memory (CD-ROM), USB flash disk, or a removable hard disk. The software product includes a number of instructions that enable a computer device (personal computer, server, or network device) to execute the methods provided in the embodiments of the present disclosure. For example, such an execution may correspond to a simulation of the logical operations as described herein. The software product may additionally or alternatively include a number of instructions that enable a computer device to execute operations for configuring or programming a digital logic apparatus in accordance with embodiments of the present disclosure.

According to embodiments, the present disclosure may be implemented as a chip, where the chip includes a processor and a data interface, and the processor reads, by using the data interface, an instruction stored in a memory, to perform one or more of the methods the described herein.

For example, a chip can be configured as a system on a chip or system-on-chip (SOC) which is readily understood to be an integrated circuit or package that integrates most or all components of a computer or other electronic system. These components can include a central processing unit (CPU), memory interfaces, on-board memory, on-chip input/output devices, input/output interfaces and secondary storage interfaces, potentially alongside other components such as radio modems and a graphics processing unit (GPU) on a single substrate or microchip. A SOC may contain one or more of digital, analog, mixed signal radio frequency signal processing functions, as would be readily understood.

As another example, a chip can be configured as a wireless chipset, which as is readily understood, is a piece of internal hardware designed to allow a device to communicate with another wireless-enabled device. This type of chipset can be found inside computers as well as a number of other wireless products, which can include an access point (AP), mobile station (STA), user equipment (UE) or other wireless device as would be readily understood.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations, or equivalents that fall within the scope of the present invention.

What is claimed is:

1. A method comprising:

receiving, by an access point (AP) or a station (STA), a request to transmit at least one sensing measurement report; and transmitting, by the AP or the STA, a sensing measurement report frame comprising a category field, a public action field, and at least one measurement set-up identifier field and at least one sensing measurement report element, wherein the sensing measurement report frame aggregates a plurality of sensing measurement reports into a single frame, and wherein the sensing measurement report frame is generated by aggregating the plurality of sensing measurement reports received by the AP prior to transmission of the sensing measurement report frame.

2. The method of claim 1, wherein the sensing measurement report frame comprises a category field, a public action field, a dialog token field, a measurement set-up identifier field, and a sensing measurement report element.

3. The method of claim 2, wherein each of the category field, the public action field, the dialog token field, and the measurement set-up identifier field are one octet.

4. The method of claim 1, wherein the sensing measurement report frame comprises a category field, a public action field, and a plurality of sensing measurement reports, each sensing measurement report of the plurality of sensing measurement reports comprising a measurement set-up identifier field, a measurement instance identifier field, and a sensing measurement report field.

5. The method of claim 1, wherein the sensing measurement report frame comprises a category field, a public action field, a measurement set-up identifier field, a measurement instance identifier field, and a plurality of sensing measurement reports, each sensing measurement report of the plurality of sensing measurement reports comprising a station identifier field and a sensing measurement report field.

6. The method of claim 5, wherein the station identifier field comprises an association identifier (AID) field.

7. The method of claim 1, wherein the at least one sensing measurement report element comprises an element identifier field, a length field, an element identifier field, a sensing measurement report type field, a sensing measurement report control field, and a sensing measurement report field.

8. The method of claim 7, wherein the sensing measurement report control field comprises a feedback bandwidth subfield, an initiator to responder (I2R) number of space time streams (N_STS) subfield, a responder to initiator (R2I) N_STS subfield, a number of subcarrier groups (Ng) subfield, a scale factor subfield, and a channel state information (CSI) feedback (FB) bit size subfield.

9. The method of claim 7, wherein the sensing measurement report control field comprises a feedback bandwidth subfield, an I2R N_STS subfield, an R2I N_STS subfield, and a number of truncated channel impulse response (TCIR) taps subfield.

10. An apparatus comprising:

at least one processor and at least one machine-readable medium storing executable instructions which when executed by the at least one processor configure the apparatus for:

receiving, by an access point (AP) or a station (STA), a request to transmit at least one sensing measurement report; and transmitting, by the AP or the STA, a sensing measurement report frame comprising a category field, a public action field, and at least one measurement set-up identifier field and at least one sensing measurement report element, wherein the sensing measurement report frame aggregates a plurality of sensing measurement reports into a single frame, and wherein the sensing measurement report frame is generated by aggregating the plurality of sensing measurement reports received by the AP prior to transmission of the sensing measurement report frame.

11. The apparatus of claim 10, wherein the sensing measurement report frame comprises a category field, a public action field, a dialog token field, a measurement set-up identifier field, and a sensing measurement report element.

12. The apparatus of claim 10, wherein the sensing measurement report frame comprises a category field, a public action field, and a plurality of sensing measurement reports, each sensing measurement report of the plurality of sensing measurement reports comprising a measurement set-up identifier field, a measurement instance identifier field, and a sensing measurement report field.

13. The apparatus of claim 10, wherein the sensing measurement report frame comprises a category field, a public action field, a measurement set-up identifier field, a measurement instance identifier field, and a plurality of sensing measurement reports, each sensing measurement report of the plurality of sensing measurement reports comprising a station identifier field and a sensing measurement report field.

14. The apparatus of claim 10, wherein the at least one sensing measurement report element comprises an element identifier field, a length field, an element identifier field, a sensing measurement report type field, a sensing measurement report control field, and a sensing measurement report field.

15. A non-transitory computer-readable medium storing executable instructions which when executed by a processor of a device configure the device for:

receiving, by an access point (AP) or a station (STA), a request to transmit at least one sensing measurement report; and transmitting, by the AP or the STA, a sensing measurement report frame comprising a category field, a public action field, and at least one measurement set-up identifier field and at least one sensing measurement report element, wherein the sensing measurement report frame aggregates a plurality of sensing measurement reports into a single frame, and wherein the sensing measurement report frame is generated by aggregating the plurality of sensing measurement reports received by the AP prior to transmission of the sensing measurement report frame.

16. The non-transitory computer-readable medium of claim 15, wherein the sensing measurement report frame comprises a category field, a public action field, a dialog token field, a measurement set-up identifier field, and a sensing measurement report element.

17. The non-transitory computer-readable medium of claim 15, wherein the sensing measurement report frame comprises a category field, a public action field, and a plurality of sensing measurement reports, each sensing measurement report of the plurality of sensing measurement reports comprising a measurement set-up identifier field, a measurement instance identifier field, and a sensing measurement report field.

18. The non-transitory computer-readable medium of claim 15, wherein the sensing measurement report frame comprises a category field, a public action field, a measurement set-up identifier field, a measurement instance identifier field, and a plurality of sensing measurement reports, each sensing measurement report of the plurality of sensing measurement reports comprising a station identifier field and a sensing measurement report field.

19. The non-transitory computer-readable medium of claim 15, wherein the at least one sensing measurement report element comprises an element identifier field, a length field, an element identifier field, a sensing measurement report type field, a sensing measurement report control field, and a sensing measurement report field.

20. The non-transitory computer-readable medium of claim 19, wherein the sensing measurement report control field comprises a feedback bandwidth subfield, an initiator to responder (I2R) number of space time streams (N_STS) subfield, an responder to initiator (R2I) N_STS subfield, a number of subcarrier groups (Ng) subfield, a scale factor subfield, and a channel state information (CSI) feedback (FB) bit size subfield.

* * * * *